(12) United States Patent
Benjamin et al.

(10) Patent No.: US 7,080,941 B1
(45) Date of Patent: Jul. 25, 2006

(54) TEMPERATURE SENSING SYSTEM FOR TEMPERATURE MEASUREMENT IN A HIGH RADIO FREQUENCY ENVIRONMENT

(75) Inventors: Neil Benjamin, Palo Alto, CA (US); Charles Ross, San Jose, CA (US); Rory Babb, Union City, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 10/294,239

(22) Filed: Nov. 13, 2002

Related U.S. Application Data

(60) Provisional application No. 60/338,033, filed on Nov. 13, 2001.

(51) Int. Cl.
*G01K 7/00* (2006.01)
*G01K 1/08* (2006.01)
*G01K 13/00* (2006.01)

(52) U.S. Cl. ............... 374/179; 374/208; 374/158; 374/141

(58) Field of Classification Search ........... 374/179, 374/183, 163, 208, 141, 158; 338/25, 28, 338/29, 229; 136/230, 232, 233; 156/345.27
See application file for complete search history.

(56) References Cited

U.S. PATENT DOCUMENTS

| | | | | |
|---|---|---|---|---|
| 2,374,377 A | * | 4/1945 | Percy | 374/208 |
| 3,147,457 A | * | 9/1964 | Gill et al. | 374/163 |
| 3,802,926 A | * | 4/1974 | Blencowe | 136/232 |
| 4,724,428 A | * | 2/1988 | Brown, Jr. | 340/653 |
| 4,749,416 A | * | 6/1988 | Greenspan | 136/232 |
| 5,071,258 A | * | 12/1991 | Usher et al. | 374/140 |
| 5,181,779 A | * | 1/1993 | Shia et al. | 374/139 |
| 5,449,432 A | * | 9/1995 | Hanawa | 156/643.1 |
| 5,490,228 A | * | 2/1996 | Soma et al. | 374/208 |
| 5,520,461 A | * | 5/1996 | Curry et al. | 374/179 |
| 5,791,782 A | * | 8/1998 | Wooten et al. | 374/208 |
| 5,999,081 A | * | 12/1999 | Hannigan et al. | 374/208 |
| 6,063,234 A | | 5/2000 | Chen et al. | |
| 6,500,299 B1 | * | 12/2002 | Mett et al. | 156/345 |
| 6,830,374 B1 | * | 12/2004 | Gray | 374/179 |

FOREIGN PATENT DOCUMENTS

| | | | | | |
|---|---|---|---|---|---|
| JP | 63300924 A | * | 12/1988 | | 374/163 |
| JP | 01288741 A | * | 11/1989 | | 374/208 |
| JP | 01299423 A | * | 12/1989 | | 374/208 |
| JP | 05164627 A | * | 6/1993 | | 374/163 |
| WO | WO 9202794 A1 | * | 2/1992 | | |

* cited by examiner

*Primary Examiner*—Diego Gutierrez
*Assistant Examiner*—Mirellys Jagan
(74) *Attorney, Agent, or Firm*—Buchanan Ingersoll PC

(57) ABSTRACT

A temperature sensing system incorporates a contact temperature sensor probe for measuring the temperature of articles. The probe is able to operate effectively even in high radio frequency environments such as those present within radio frequency excited plasma processing chambers. The temperature sensing system includes a contact temperature sensor, such as a thermocouple, surrounded by a shielding sheath of a material such as aluminum which is clad with one or more layers of a cladding material. A tip insulator is provided surrounding the sheath for providing RF insulation and thermal coupling. An RF insulating and thermal insulating mounting member is connected to the tip insulator for mounting the probe on an article to be measured.

44 Claims, 4 Drawing Sheets

TEMPERATURE SENSING SYSTEM FOR TEMPERATURE MEASUREMENT IN A HIGH RADIO FREQUENCY ENVIRONMENT

CROSS REFERENCE TO RELATED APPLICATIONS

This application claims priority to U.S. Provisional Patent Application Ser. No. 60/338,033, filed on Nov. 13, 2001, which is hereby incorporated by reference in its entirety.

FIELD OF THE INVENTION

The invention relates to a temperature sensing system, and more particularly the invention relates to a temperature sensing system for temperature measurement in a high radio frequency environment.

DESCRIPTION OF THE RELATED ART

Temperature sensing using temperature senors has in the past been performed in many ways for many purposes. In general, temperature measurement can be divided into two categories: contact temperature measurement and non-contact temperature measurement. In the contact category, temperature sensing devices contact a surface whose temperature is to be measured. In effect, the contact temperature sensors measure their own temperature and tend to be slow in responding to temperature changes. On the other hand, in the non-contact category, temperature sensors measure optical emission (e.g., infrared radiation) emitted from the surface. The non-contact temperature sensors tend to respond more quickly than contact temperature sensors, but are more expensive. There are also accuracy differences between contact and non-contact temperature sensors.

In situations in which the temperature sensing must occur in the presence of significant amounts of radio frequency (RF) interference, the temperature sensing is made more difficult. Specifically, the RF noise tends to interfere with electrical signals that represent the temperature measurement. Hence, temperature measurement is often not possible because the electrical signals normally used to represent the temperature measurement are overwhelmed by the RF interference. One example of an environment having significant amounts of RF interference is in semiconductor manufacturing equipment, such as semiconductor wafer plasma processing equipment, where RF signals are used to generate discharges.

For contact temperature measurement, there are various ways to measure temperature, e.g., thermistors, resistance temperature devices (RTD), thermocouples, platinum resistance bulbs, bulk silicon devices, and active solid state devices, but temperature sensing in an environment having significant RF interference remains technologically challenging as electrical temperature sensors pick up the RF interference. Another problem with contact temperature measurement is that the temperature sensors can perturb the RF tuning and operation of the discharge in a semiconductor processing chamber by virtue of their impedance to ground, particularly if arching occurs. If arching occurs, the sensor and measurement circuit may be damaged or destroyed. With the RF tuning perturbed, the processing within the semiconductor processing chamber is no longer reliable.

For non-contact temperature measurement, infrared and phosphor fluorescence techniques can be used for temperature sensing in a RF environment. Some of these optical approaches are able to utilize optical isolation to avoid the RF interference, others are not. The optical isolation could, for example, be provided by shining pulsed ultraviolet light onto a flourescent surface, then determining the temperature from the emitted photons from the flourescent surface. An example of such a sensor is made by Luxtron. The optical isolation could alternatively use the amount of infrared light emitted from a surface to determine the temperature. Some infrared techniques, such as infrared thermocouples, can remain unaffected by RF interference, however, these temperature sensors are limited to use in low temperature environments. Even if these optical approaches are able to provide optical isolation that mitigates RF interference, there are some problems with these approaches.

Within a processing chamber, there is a glow discharge that produces a full spectrum of electromagnetic radiation ranging from microwave, RF, and infrared to visible and ultraviolet light. One problem is that the optical approaches must deal with the optical interference from the glow discharge internal to the processing chamber. The ability to monitor temperatures internal to a processing chamber is desirable because temperature plays a significant role in the semiconductor processing performed in the processing chamber and variations in temperature can cause processes to vary and therefore fail. More particularly, in the case of semiconductor manufacturing equipment, the temperature of various components within the processing chamber affects the processing performed by the semiconductor manufacturing equipment. For example, in the case of etching, the etch process should occur within a predetermined temperature range and when the temperature exceeds the predetermined temperature range, the etching reactions will be altered, thereby causing etch process drift. More seriously, if a processing chamber is overheated for an extended length of time, but not noticed by the operators because of lack of temperature monitoring, the process chamber can be seriously damaged. In this case, the semiconductor processing equipment must be shutdown for maintenance. Any major shutdown of equipment in a semiconductor manufacturing environment will increase the cost of production and should be prevented if possible. Another problem with these optical approaches is that the cost for such temperature monitoring systems is expensive, since a spectrometer or other sophisticated electro-optic instruments may be required.

U.S. Pat. No. 6,063,234 describes a temperature sensing system using contact sensors and an RF filter circuit that suppresses the RF interference. The temperature sensing system can be used for measuring temperatures in RF environments, such as within semiconductor processing equipment.

However, there is a need for an improved temperature sensing system for measuring temperature in high RF environments with good consistency at relatively low cost with no filtering or limited filtering requirements.

SUMMARY OF THE INVENTION

The present invention relates to an embedded thermocouple sensor for measuring temperatures of articles or areas even in a high radio frequency environment. The embedded thermocouple sensor is particularly well suited for temperature measurements within semiconductor processing chambers.

In accordance with one aspect of the present invention, a temperature sensing system includes a contact temperature sensor probe, a shielding sheath surrounding the probe, a tip insulator of RF insulating and thermally conducting material encasing a tip of the probe, and a mounting member connected to the tip insulator adapted to mount the thermocouple probe on an article to be measured with the tip insulator in thermal contact with the article to be measured.

In accordance with another aspect of the present invention, a temperature sensing system includes a contact temperature sensor probe, a shielding sheath of an RF conducting material surrounding the thermocouple, and a tip insulator of ceramic material encasing a tip of the probe. The shielding sheath and the tip insulator configured to stand off an RF voltage up to about 5 kV at about 13 MHZ.

In accordance with a further aspect of the present invention, a semiconductor processing chamber includes a semiconductor processing chamber, an RF generator for generating an RF excited plasma within the chamber, and a temperature sensor comprising: a contact temperature sensor probe; a shielding sheath surrounding the probe; a tip insulator of RF insulating and thermally conducting material encasing a tip of the probe; and a mounting member connected to the tip insulator mounting the thermocouple probe on an article to be measured within the chamber.

In accordance with another aspect of the present invention, a method of sensing a temperature in an article in a high RF field includes the steps of:

shielding a contact temperature sensor probe with a ceramic tip insulator which provides an RF insulation for the probe while providing thermal conduction between the article and the probe; and conducting RF energy along an RF conducting shielding sheath from the contact temperature probe to a ground.

BRIEF DESCRIPTION OF THE DRAWING FIGURES

The invention will now be described in greater detail with reference to the preferred embodiments illustrated in the accompanying drawings, in which like elements bear like reference numerals, and wherein.

DETAILED DESCRIPTION OF THE INVENTION

The invention relates to a temperature sensing system that measures temperatures of articles or areas using an electrical contact sensor. The temperature sensing system of the present invention is able to operate effectively and reproducibly even in a high radio frequency environment.

The temperature sensing system includes a contact sensor having an RF insulating tip. The temperature sensing system is placed in contact with an article or area for monitoring its temperature. The contact sensor with the insulating tip is useful in noisy environments to shield out external fields, such as RF electromagnetic fields and other noise, so that the contact sensor can operate more accurately and so that RF filtering requirements for down stream instrumentation are significantly reduced. The contact sensor used in the temperature sensing system of the present invention is described below as a thermocouple. However, other types of electrical contact sensors may also be used including thermistors, resistance temperature devices (RTD), thermocouples, platinum resistance bulbs, bulk silicon devices, and active solid state devices.

Figure 1:
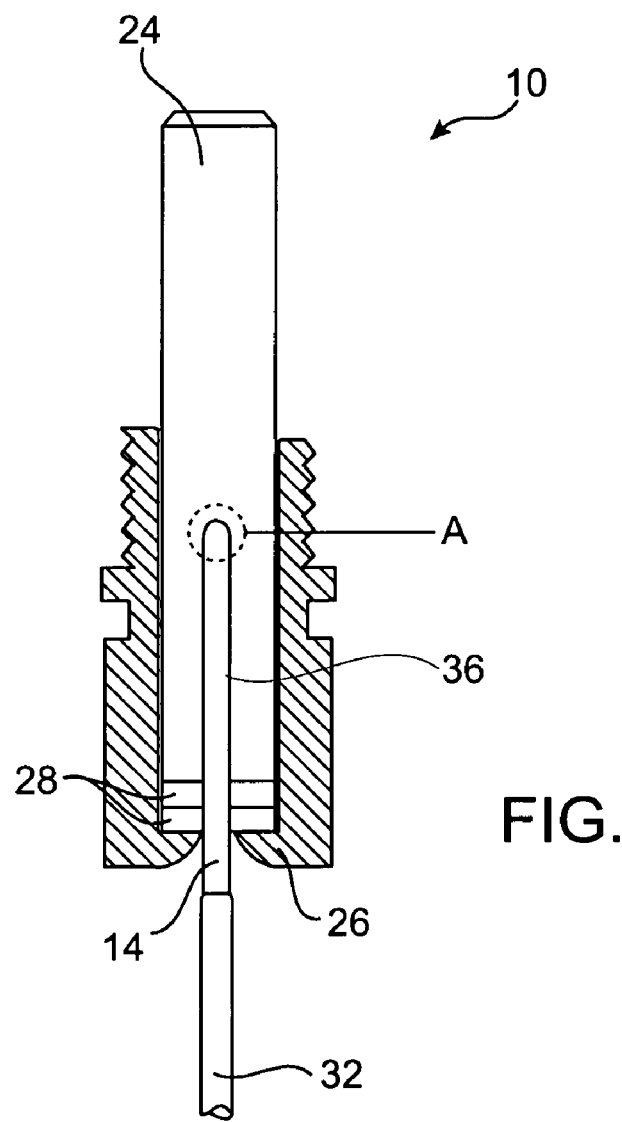
FIG. 1 is a side cross sectional view of a temperature sensing system according to the present invention.

FIG. 1 illustrates one example of a temperature sensing system 10. The temperature sensing system 10 includes a thermocouple probe 14 provided with a tip 24 which acts as an RF insulator and a thermal coupler for the probe. The thermocouple probe 14 may be any known thermocouple, such as an iron constantan J-type thermocouple. Alternatively, the probe 14 may also be one of the other contact sensors mentioned above. A standard thermocouple 14 has limitations when used in a high RF field environment due to self-heating errors and over voltage and thermal failure. The tip 24 protects the thermocouple 14 from the effects of the RF field while providing a heat pipe to effectively transfer heat from the article to be measured to the probe 14. The probe 14 is also shielded by an RF conductive sheath 16 which operates to conduct RF energy to a ground.

Figure 1A:
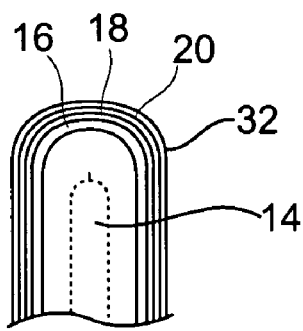
FIG. 1A is an enlarged view of a portion A of FIG. 1.

As shown in FIG. 1A, the shielding sheath 16 is provided around the probe 14 and may be coated with one or more layers. The shielding sheath 16 functions to shield the thermocouple probe 14 from external fields, so that the thermocouple can operate in a grounded or at least local field free environment. The material of the sheath 16 should be selected to be sufficiently electrically conductive so as to exclude external fields and also to be at or close to the same potential as the measuring circuit to which the thermocouple is connected. According to one example, the shielding sheath 16 may be fabricated from extruded stainless steel or nickel-based alloy, such as Inconel, both of which are relatively poor thermal and electrical conductors. The sheath 16 can have a thickness of about 0.004 inches to about 0.02 inches. While the shielding sheath 16 of stainless steel or nickel-based alloy, such as Inconel, shields from some external energy fields, it may not be adequate for shielding at RF frequencies and particularly, at high RF frequencies of about 13 MHZ or greater which occur in semiconductor processing chambers. At these higher frequencies, the sheath of this thickness will still be transparent to RF electromagnetic field penetration due to the skin depth effect and thus, can allow coupling to the thermocouple conductors contained within.

In order to prevent this effect, the shielding sheath 16 can be made more RF conductive and/or thicker in any known manner. According to one embodiment, cladding 18, 20 is added to the shielding sheath 16 to significantly reduce RF electromagnetic field penetration.

According to one example, the cladding can include a cladding of first cladding of copper 18 to provide excellent RF conductance. A second cladding of silver 20 may be added to prevent corrosion of the copper cladding 18. The silver cladding 20 also has excellent RF conductance properties. The combination of claddings 18, 20 can have a combined depth of about 0.001 inches to about 0.02 inches.

According to another example, the silver cladding may be used alone. The silver cladding alone may be preferred over the combination of copper and silver because silver has a lower thermal conductivity than that of copper causing less heat to be transmitted along the shaft.

The combination of the original shielding sheath material 16 and the single or double cladding 18, 20 is effectively opaque to RF fields and can restrict any resulting current causing it to run along the external surface of the sheath to a ground which is provided. One example of a protective ground will be described below with respect to FIG. 4.

The total thickness of the shielding sheath 16 with the cladding 18, 20 described above provides a good electromagnetic shield without having too much thermal capacity or thermal conductance to cause thermal errors in the temperature sensing system. If the sheath is too thick, it will provide a good electromagnetic shield but will also be highly thermal conductive and have a high thermal capacity. A high thermal conductivity and thermal capacity will render accurate and responsive temperature measurements difficult by slowing the response time of the thermocouple probe while causing excessive conduction of heat to or from the thermocouple from the ambient environment. The problem of thermal conduction from the ambient is addressed in the present invention by thermally isolating the probe tip 14 and the tip 24 from the ambient environment by the use of an insulating mounting nut 26 and sheath insulation 32.

The sheath 16 and cladding 18, 20 can be provided with a plastic tubing insulating sheath 32 (e.g., PFA or PTFE, such as Teflon) to provide environmental thermal isolation and RF protection from other items in the environment.

The tip 24 is in the form of a slug of material which encases the probe 14 and shielding sheath 16 and provides RF insulation of the probe and thermal coupling between the article to be measured and the probe 14. The tip 24 and probe 14 are retained to an article to be measured by the insulating mounting nut 26. According to one example of the invention, the tip 24 includes a blind bore 36 into which the probe 14 is mounted.

The thermocouple probe 14 may be mounted into the bore 36 in the tip 24 in a known manner. For example, the probe 14 may be bonded into the blind bore 36 in the tip 24 with thermal epoxy. The tip 24 is in the form of a slug of material which extends beyond the end of the probe 14 to provide a heat pipe effect. The thermocouple probe 14 is inserted into the tip 24 to a relatively shallow depth, such as about ¼ to about ¾ of the total length of the tip 24, such that the RF insulation is maximized by a large slug of material located beyond the probe tip and stray capacitance is minimized. Preferably, the probe 14 is inserted into the tip 24 to a depth of less than about ⅓ or less than about ½ of the length of the tip 24.

The tip 24 may be formed from a number of materials which provide the desired RF insulation and thermal conduction. The tip material preferably has a thermal conductivity which is at least that of Alumina, and an electrical insulating ability to stand off about 5 kV at about 13 MHZ with a resistance of about 10 Mohms or greater. Preferably, the tip material has a low dielectric constant, for example less than or equal to about 10 and a capacitive coupling of less than about 3 pF.

Suitable materials for the tip 24 include certain ceramics such as aluminum nitride. Aluminum nitride and other ceramics are preferred due to the combination of electrical properties of a good dielectric combined with excellent thermal conduction properties approaching that of aluminum. The insertion depth of the thermocouple probe 14 into the tip 24 is minimized to reduce the electrical compacitive coupling to about 1 pF to about 2 pF.

A length of tip material extending beyond the tip of the probe 14, as well as the material of the tip material, may be selected depending on the particular RF environment and accuracy of temperature measurement needed. According to one embodiment, the length of the tip material extending beyond the tip of the probe is about 0.25 inches to about 2.0 inches, and preferably, the length is at least 0.5 inches.

The tip 24 is surrounded by the mounting nut 26 in the form of a hollow bolt which is provided for mounting the temperature sensing system 10 into the article or area to be measured. The tip 24 is installed in an opening in an article by threading the mounting nut 26 into the article. The mounting nut 26 is formed of an RF insulating and thermally insulating material, such as plastic. According to one embodiment, a thermal heat sink compound, such as thermal grease or thermal epoxy is used to improve the thermal contact between the tip 24 and the article and reduce thermal error due to a temperature gradient between the probe and the article. The insertion of the tip 24 into the article to be measured must be sufficient to provide adequate thermal contact but at the same time, the RF insulation must be maintained to minimize RF energy coupling. In addition, thermal contact to the ambient environment must be minimized. Thus, the tip 24 maintains relatively intimate thermal contact with an article to be measured while effectively making the thermocouple electrically remote from the article to be measured.

The tip 24 according to the embodiment shown can isolate the thermocouple 14 from an RF voltage up to about 5 kV and preferably up to about 8 kV at 13 MHZ.

The insulating mounting nut 26 helps insulate both electrically and thermally and incorporates one or more springs, such as the compact elastomeric foam springs 28, to ensure contact of a free end of the tip 24 with the article to be measured. The elastomeric foam spring 28 is positioned between a probe end of the tip 24 and an end flange of the mounting nut 26. The spring 28 reduces thermal conduction to ambient and avoids the need for a metallic spring which could reduce the voltage withstanding capability. One example of a spring 28 is a silicone sponge.

Figure 2:
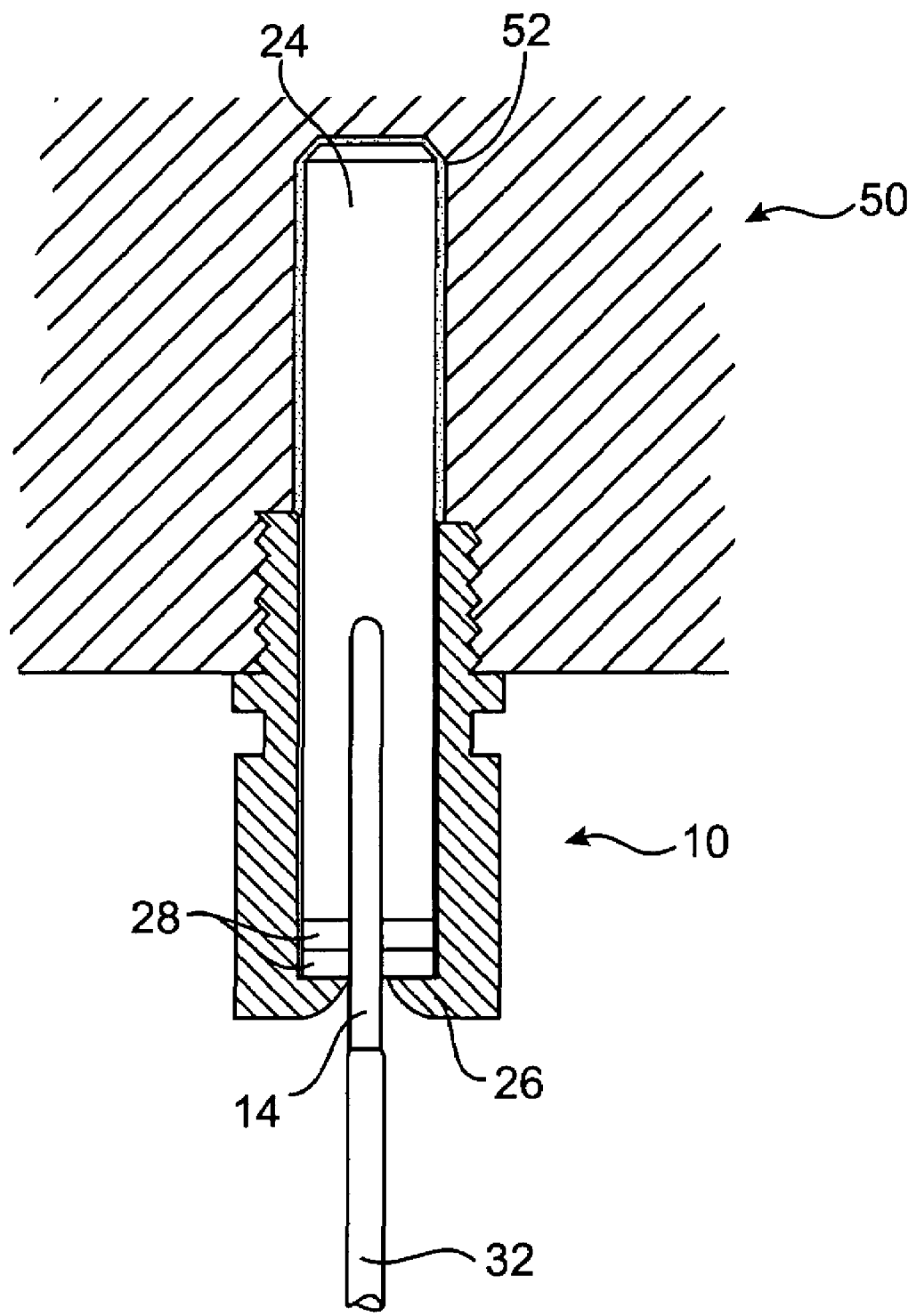
FIG. 2 is a side cross sectional view of the temperature sensing system of FIG. 1 installed in an article.

FIG. 2 illustrates the temperature sensing system 10 mounted within an article 50. The article 50 is provided with an opening having a close tolerance to the size of the tip 24. The minimal clearance between the end and sides of the tip 24 and the opening in the article is filled with thermal transfer composition 52 to improve thermal transfer from the material on all sides of the tip to the probe 14.

Figure 3:
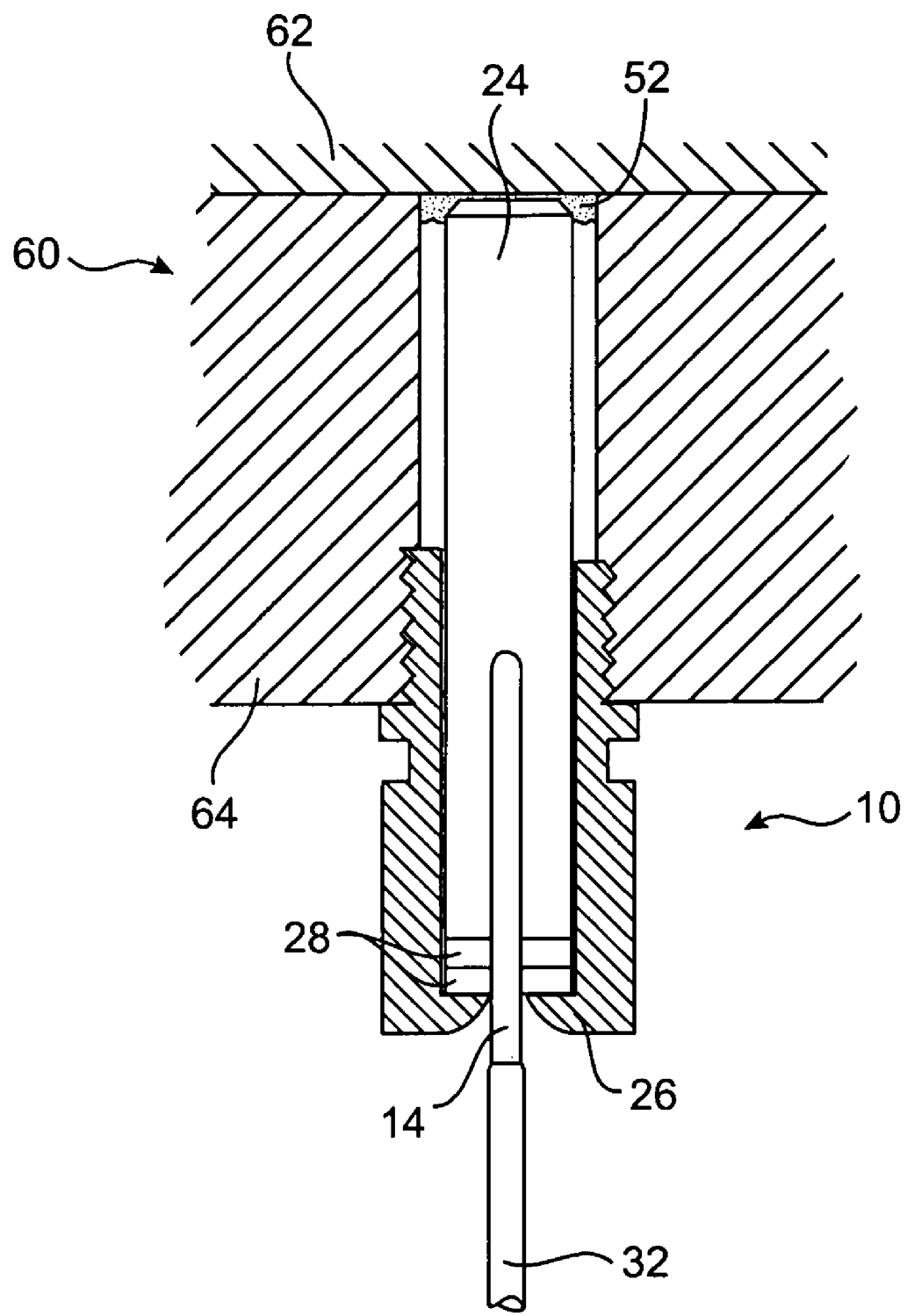
FIG. 3 is a side cross sectional view of the temperature sensing system of FIG. 1 installed in an article for tip measurement.

In the alternative embodiment of FIG. 3, an article 60 is provided with an opening having a diameter which is selected to provide a small clearance between the sides of the tip 24 and the opening. Thus, only an end of the tip 24 is in contact with the article 60 and is provided with thermal transfer composition 52 for measurement of the temperature of the article at the end of the opening and not along the sides. This arrangement may be useful for measuring a ceramic electrode material 62 by passing a probe through an aluminum base plate 64. The clearance around the tip 24 in the embodiment of FIG. 3 may optionally be provided with a plastic or other insulating liner to further prevent lead conduction errors due to side thermal transfer.

The shielding sheath 16 and cladding 18, 20 of the thermocouple probe 14 together are effectively opaque to RF fields and restrict any resulting current flow to run along the external surface of the sheath. Grounding of this current is provided by a grounded mounting tab. The exterior of the sheath 16 may be connected to one or more grounds. The grounds may include one or more grounding brackets or plugs.

Figure 4:
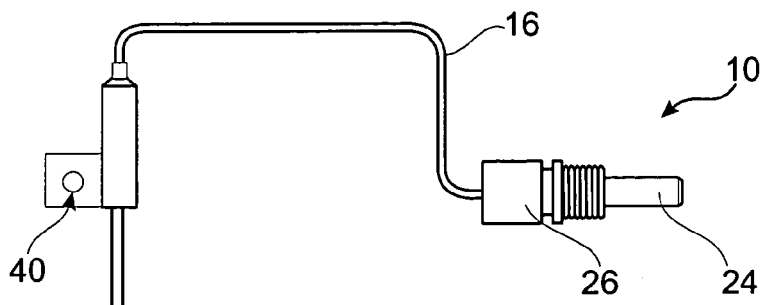
FIG. 4 is a side view of the temperature sensing system of FIG. 1 and an associated cable and plug.
Figure 4:
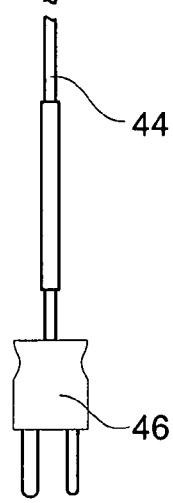

FIG. 4 illustrates the temperature sensing system 10 and the grounded mounting tab 40 which provides a ground for the sheath 16 when attached to a good RF ground point. Also shown in FIG. 4 are a foil shielded cable 44 and a plug 46 for the temperature sensing system. According to one embodiment of the invention, the grounded mounting tab 40 is a high quality RF protective ground which is positioned along the thermocouple probe sheath 16 where the shielding sheath 16 transitions from stainless steel and silver shielding to a regular foil shielding, or, other shielding. This allows the RF current to be carried by the exterior of the sheath 16 along the more effectively sheathed tip portion of the thermocouple probe 14. The shielding sheath 16 provides a highly conductive path for diverting RF current to the ground 40 and prevents self-heating of the shielding sheath 16 and the thermocouple conductors contained therein.

The assembled temperature sensing system 10 provides relatively accurate and responsive temperature measurements in high voltage RF noisy environments without self-heating errors and thermal failures occurring with other shielded thermocouple probes.

Figure 5:
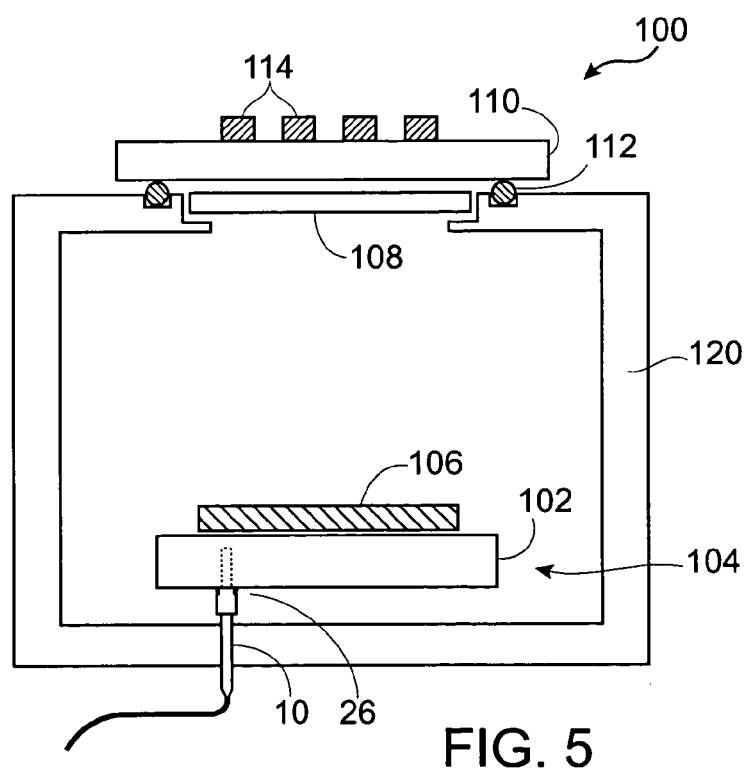
FIG. 5 is a schematic diagram of the temperature sensing system of FIG. 1 mounted in an electrostatic chuck of a semiconductor processing chamber.

The temperature sensing system 10 is particularly well suited for monitoring and measuring temperatures within semiconductor manufacturing equipment, such as etching, deposition, and other processing chambers. One example of a semiconductor processing chamber 100 is illustrated in FIG. 5. The processing chamber 100 contains a bottom electrode and chuck 104 that holds a wafer 106. The wafer 106 is being processed in the processing chamber 100 by, for example, performing etching or deposition.

In the example of FIG. 5, the processing chamber 100 includes a gas distribution plate 108 typically located in an upper portion of the processing chamber that has an opening over which a window 110 is placed and sealed by use of a gasket 112. The gas distribution plate 108 functions to control the gas distribution used in a plasma etch process. In one embodiment, the window 110 includes an antenna 114 on an upper surface. The antenna 114 produces the RF field for the plasma etch process.

In the illustrated embodiment of FIG. 5, the temperature sensing system is mounted in the aluminum base plate 102 of the wafer clamping electrostatic chuck (ESC) 104 in the RF excited plasma processing chamber 100. The thermocouple sensor 10 is then able to accurately monitor the temperature of the base plate 102. Alternatively, the temperature sensing system 10 may be positioned in other articles within the chamber such as the gas distribution plate 108, the chamber wall 120, or other portions of the electrostatic chuck 104, particularly RF hot portions. The temperature sensing system 10 can also be used in other applications with similar RF noisy environments.

While the invention has been described in detail with reference to the preferred embodiments thereof, it will be apparent to one skilled in the art that various changes and modifications can be made and equivalents employed even in different applications with similar RF noisy environments, without departing from the present invention.

What is claimed is:

1. A temperature sensing system, comprising:
an electrical contact temperature sensor probe having a tip;
a shielding sheath surrounding the probe such that the shielding sheath fully surrounds and encloses the tip of the probe; and
a tip insulator of RF insulating and thermally conducting material surrounding the probe and the shielding sheath, the probe and surrounding sheath being inserted into the tip insulator to a depth of less than ⅔ of a total length of the tip insulator.

2. A temperature sensing system comprising:
a contact temperature sensor probe having a tip;
a shielding sheath of an RF conducting material, the shielding sheath surrounding the probe such that the shielding sheath fully surrounds and encloses the tip of the probe; and
a tip insulator of ceramic material fully surrounding and enclosing the tip of the probe and surrounding the shielding sheath, the tip insulator having a portion having a length of at least 0.25 inches extending beyond the tip of the probe.

3. A temperature sensing system comprising:
a contact temperature sensor probe;
a shielding sheath of an RF conducting material, the shielding sheath surrounding the probe; and
a tip insulator of ceramic material fully surrounding and enclosing a tip of the probe, the shielding sheath and the tip insulator configured to stand off an RF voltage up to about 5 kV at frequencies of about 13 MHz or higher, wherein the probe and surrounding sheath are inserted into the tip insulator to a depth of less than ⅔ of a total length of the tip insulator.

4. A temperature sensing system comprising:
a contact temperature sensor probe having a tip;
a shielding sheath of an RF conducting material, the shielding sheath surrounding the probe such that the shielding sheath fully surrounds and encloses the tip of the probe;
a tip insulator of ceramic material fully surrounding and enclosing the tip of the probe and surrounding the shielding sheath, the tip insulator including an exposed outer surface; and
an insulating mounting nut surrounding an end of the tip insulator.

5. The system of claim 4, wherein:
the shielding sheath is formed of stainless steel or nickel chromium alloy sheath, the shielding sheath including a silver cladding.

6. The system of claim 4, wherein the tip insulator is formed of aluminum nitride.

7. The system of claim 4, wherein the mounting nut is provided with a spring element which maintains contact between the tip insulator and the object to be measured.

8. The system of claim 4, wherein the contact temperature sensor probe comprises a thermocouple.

9. The system of claim 4, wherein the shielding sheath and the tip insulator are configured to stand off an RF voltage up to about 5 kV at frequencies of about 13 MHz or higher.

10. The system of claim 4, wherein the mounting nut is formed of an RF insulating and thermally insulating material.

11. The system of claim 4, wherein the mounting nut comprises exterior threads.

12. A temperature sensing system comprising:
an electrical contact temperature sensor probe;
a shielding sheath fully surrounding and enclosing a tip of the probe;
a tip insulator of RF insulating and thermally conducting material fully surrounding and enclosing the tip of the probe, the tip insulator having an end portion having a length of at least 0.25 inches extending beyond an end of the probe, the tip insulator having an inner surface spaced from the end of the probe; and
a mounting member adapted to mount the probe on an article to be measured with the tip insulator in thermal contact with the article to be measured.

13. The system of claim 12, wherein the tip insulator is formed of aluminum nitride.

14. The system of claim 12, wherein the shielding sheath and tip insulator are selected to stand off an RF voltage up to about 5 kV at frequencies of about 13 MHz or higher.

15. The system of claim 12, wherein the contact temperature sensor probe comprises a thermocouple.

16. The system of claim 12, wherein the tip insulator and mounting member are configured to be removably mounted in an opening in an electrostatic chuck.

17. The system of claim 12, wherein the tip insulator is formed of a thermally conductive ceramic.

18. The system of claim 12, wherein the tip insulator has a capacitive coupling of less than about 3 pF.

19. The system of claim 12, wherein the tip insulator is formed of a material with a thermal conductivity which is at least that of alumina.

20. The system of claim 12, wherein the end portion of the tip insulator has a length of at least about 0.5 inches extending beyond the end of the probe.

21. The system of claim 12, wherein the tip insulator extends from an open end of the mounting member.

22. The system of claim 12, wherein the shielding sheath has a total thickness of about 0.004 inches to about 0.02 inches.

23. The system of claim 22, wherein the shielding sheath is formed of stainless steel or Inconel.

24. The system of claim 12, further comprising a spring element arranged to maintain contact between the tip insulator and the article to be measured.

25. The system of claim 24, wherein the spring element is non-electrically conductive.

26. The system of claim 24, wherein the spring element is non-thermally conductive.

27. The system of claim 12, wherein the mounting member is a hollow mounting nut surrounding the tip insulator.

28. The system of claim 27, wherein the mounting nut is provided with an elastomeric foam spring between the mounting nut and the tip insulator which maintains contact between the tip insulator and the article to be measured.

29. The system of claim 27, wherein the mounting nut is formed of an RF insulating and thermally insulating material.

30. The system of claim 29, wherein the mounting nut is formed of plastic.

31. A temperature sensing system comprising:
an electrical contact temperature sensor probe;
a shielding sheath surrounding the probe, the shielding sheath including at least one layer of highly electrically conductive cladding, the cladding having a total thickness of about 0.001 inches to about 0.02 inches;
a tip insulator of RF insulating and thermally conducting material fully surrounding and enclosing a tip of the probe, the tip insulator having an end portion having a length of at least about 0.25 inches extending beyond an end of the probe; and
a mounting member adapted to mount the probe on an article to be measured with the tip insulator in thermal contact with the article to be measured.

32. A temperature sensing system comprising:
an electrical contact temperature sensor probe;
a shielding sheath surrounding the probe;
a tip insulator of RF insulating and thermally conducting material fully surrounding and enclosing a tip of the probe, the tip insulator having an end portion having a length of at least 0.25 inches extending beyond an end of the probe; and
a mounting member adapted to mount the probe on an article to be measured with the tip insulator in thermal contact with the article to be measured,
wherein the probe and surrounding sheath are inserted into the tip insulator to a depth of less than ⅔ of a total length of the tip insulator.

33. The thermocouple probe of claim 32, wherein the probe and surrounding sheath are inserted into the tip insulator to a depth of less than ½ of a total length of the tip insulator.

34. A temperature sensing system comprising:
an electrical contact temperature sensor probe;
a shielding sheath surrounding the probe, the shielding sheath comprising an inner layer having relatively low thermal and electrical conductivities and an outer layer having a high electrical conductivity;
a tip insulator of RF insulating and thermally conducting material fully surrounding and enclosing a tip of the probe, the tip insulator having an end portion having a length of at least about 0.25 inches extending beyond an end of the probe; and
a mounting member adapted to mount the probe on an article to be measured with the tip insulator in thermal contact with the article to be measured.

35. A semiconductor processing system having a temperature sensor, the system comprising:
a semiconductor processing chamber;
an RF generator for generating an RF excited plasma within the chamber; and
a temperature sensor comprising:
a contact temperature sensor probe;
a shielding sheath fully surrounding and enclosing a tip of the probe;
a tip insulator of RF insulating and thermally conducting material fully surrounding and enclosing the tip of the probe, the tip insulator having an end portion having a length of at least 0.25 inches extending beyond an end of the probe, the tip insulator having an inner surface spaced from the end of the probe; and
a mounting member connected to the tip insulator mounting the probe on an article to be measured within the chamber.

36. The semiconductor processing system of claim 35, wherein the RF generator for generating an RF excited plasma operates at frequencies of about 13 MHz or higher, and the shielding sheath and tip insulator are selected to stand off an RF voltage up to about 5 kV.

37. The semiconductor processing system of claim 35, wherein the temperature sensor is mounted in a portion of an electrostatic chuck of the processing chamber.

38. The semiconductor processing system of claim 35, wherein the processing chamber is a plasma etch chamber.

39. The system of claim 35, wherein the contact temperature sensor probe comprises a thermocouple.

40. The semiconductor processing system of claim 35, wherein the end portion of the tip insulator has a length of at least about 0.5 inches extending beyond the end of the probe.

41. The semiconductor processing system of claim 35, wherein the tip insulator extends from an open end of the mounting member.

42. A method of sensing a temperature in an article in a high RF field, the method comprising:

placing a contact temperature sensor probe in a high RF field;

shielding the contact temperature sensor probe with a ceramic tip insulator which includes an exposed outer surface and fully surrounds and encloses a tip of the temperature sensor probe and provides an RF insulation for the probe while providing thermal conduction between the article and the probe;

conducting RF energy along an RF conducting shielding sheath from the contact temperature sensor probe to a ground, the shielding sheath fully surrounding and enclosing the tip of the probe, the tip insulator surrounding the shielding sheath; and sensing a temperature with the probe.

43. The method of claim 42, wherein during the sensing of the temperature with the probe the shielding sheath and tip insulator stand off an RF voltage up to about 5 kV at frequencies of about 13 MHz or higher.

44. A temperature sensing system comprising:

an electrical contact temperature sensor probe;

a shielding sheath surrounding the probe;

a tip insulator of RF insulating and thermally conducting material fully surrounding and enclosing a tip of the probe, the tip insulator having an end portion having a length of at least 0.25 inches extending beyond an end of the probe; and a mounting member adapted to mount the probe on an article to be measured with the tip insulator in thermal contact with the article to be measured, wherein the shielding sheath comprises an inner layer having relatively low thermal and electrical conductivities and an outer layer having a high electrical conductivity, wherein the outer layer transmits electrical energy away from the probe tip to a ground.

* * * * *